Dec. 21, 1943.  W. J. HALL  2,337,387
MOLDING AND METHOD OF MANUFACTURING SAME
Original Filed Jan. 20, 1938
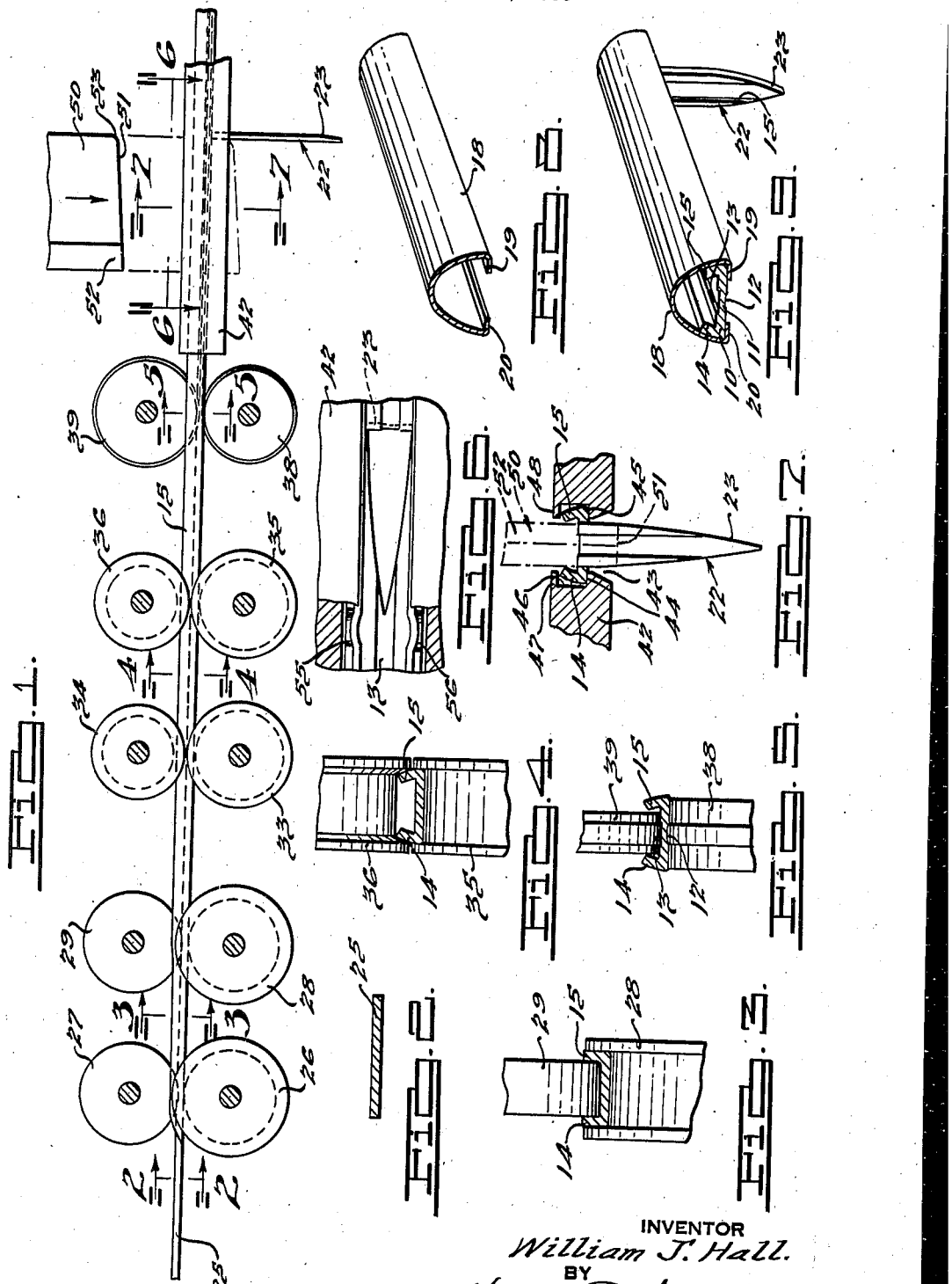
INVENTOR
William J. Hall.
BY
Harness, Dickey & Pierce
ATTORNEYS.

Patented Dec. 21, 1943

2,337,387

UNITED STATES PATENT OFFICE 2,337,387

MOLDING AND METHOD OF MANUFACTURING SAME

William J. Hall, Detroit, Mich., assignor to Herron-Zimmers Moulding Company, Detroit, Mich., a corporation of Illinois Original application January 20, 1938, Serial No. 185,811, now Patent No. 2,284,421, dated May 26, 1942. Divided and this application April 18, 1941, Serial No. 389,230

4 Claims. (Cl. 29—33)

The invention relates generally to molding and it has particular relation to apparatus for and a method of fabricating molding.

The present application constitutes a division of my copending case, Serial No. 185,811, filed January 20, 1938, entitled "Molding and method of manufacturing the same," which has matured into Patent No. 2,284,421 of May 26, 1942.

One object of the present invention is to provide an efficient method of producing molding comprising a base element having prongs struck therefrom.

Another object of the invention is to provide a method of fabricating a molding having prongs which permits making the molding out of inexpensive metals while still obtaining desired strength characteristics.

Another object of the invention is to provide apparatus for efficiently and accurately making molding of the aforesaid character.

Other objects of the invention will become apparent from the following specification, the drawing relating thereto, and from the claims hereinafter set forth.

For a better understanding of the invention, reference may be had to the drawing wherein:

Figure 1 is a general layout view illustrating apparatus for forming molding according to one form of the invention;

Fig. 2 is a cross-sectional view taken substantially along the line 2—2 of Fig. 1;

Fig. 3 is a cross-sectional view taken substantially along the line 3—3 of Fig. 1;

Fig. 4 is a cross-sectional view taken substantially along the line 4—4 of Fig. 1;

Fig. 5 is a cross-sectional view taken substantially along the line 5—5 of Fig. 1;

Fig. 6 is a cross-sectional view taken substantially along the line 6—6 of Fig. 1;

Fig. 7 is a cross-sectional view taken substantially along the line 7—7 of Fig. 1;

Fig. 8 is a view illustrating a cover constructed according to one form of the invention;

Fig. 9 is a view illustrating a finished molding constructed according to one form of the invention.

Referring to the drawing, the molding illustrated comprises an inner base strip 10 formed from malleable steel of low carbon content, such as ordinary cold rolled steel. This strip has an intermediate portion 11 extending longitudinally which is strengthened by cold working of the metal, and in effecting this cold working, a groove 12 is formed in the lower side of the strip and a shallow but wider recess 13 is formed in the upper side of the strip. Flanges 14 and 15 project upwardly from opposite side edges and are disposed in slightly converging relation with the outer surfaces of the flanges somewhat rounded. A relatively thin cover member 18, formed from stainless steel, is attached to the base member by means of inwardly directed lugs 19 and 20 engaging under the opposite edges of the base. The cover generally forms a channel at its upper side and side portions of the cover substantially fit the flanges 14 and 15.

For the purpose of attaching the molding to a supporting surface, prongs 22 are provided in longitudinally spaced relation on the base strip and these prongs are formed by striking out the metal along the central strengthened portion. Thus, one side of the prong has the shallow recess 15 therein while the opposite side has the groove 12. The prong is substantially pointed as indicated at 23 and due to the groove and recess extending to the point, the prong is not only sharp as a result of the converging edges but also because of the thinner metal caused by the groove and recess. It will be evident that the provision of a strengthened intermediate portion from which the prongs substantially are formed effects a greater prong strength in all directions transverse to its length, and, furthermore, the strip itself is stronger both transversely and longitudinally. Additionally, the flanged edges on the strip result in greater strength in the strip. Thus, even though the strip is formed of ordinary, low carbon steel of malleable character, of an initial thickness which might not provide the desired strength in prong as well as strip, the reinforcements mentioned provide the desired strength. An effect of this procedure is to secure the desired strength at a lower cost and since the cover is of finishing character, an ornamental molding of good appearance is provided at low cost.

In constructing molding of this character, a strip 25 of the ordinary steel mentioned is first provided in ribbon form as shown in Figs. 1 and 2 and then this an passed between sets of rollers 26—27 and 28—29, which initially form the flanges 14 and 15 at the side edges of the strip. Then, the strip passes between sets of rollers 33—34 and 35—36, which alter the contour of the flanges so that they assume the configuration shown in Fig. 4.

Following this, the strip passes between rollers 38 and 39 which form the groove 12 and shallow recess 13 in the strip. Formation of these grooves strainhardens the metal by cold working and thus the intermediate portion of the strip is strengthened.

In forming the prongs, a lower supporting member 42 is provided which has a slot 43 of open end character and at opposite sides of this slot shoulders 44 and 45 are provided which are adapted to support opposite edge portions of the strip. Above these shoulders 44 and 45 the supporting member 42 is shaped to provide a confining recess having overhanging shoulders 47 and 48 adapted to prevent upward movement of the strip. It will be evident that the strip may be moved along through the recess 46 freely while still being maintained substantially in a predetermined path of movement.

For forming the prongs, a punch or tool 50 is provided which has an inclined lower edge face 51, inclining downwardly to a V-shaped forward edge 52. The upper end of the lower face is rounded as indicated at 53. Movement of the punch downwardly causes the V-shaped edge of the punch 52 to first strike the center of the recess 15 in the strengthened portion of the strip and to cut through the metal at this point and then formation of the prong is progressive as more and more of the punch contacts the metal. It will be observed that the V-shaped edge of the punch cuts through the strengthened portion first and that after the sharpened point is thus determined, the side edges of the punch cut the metal progressively at opposite sides of the grooved portion. This procedure simplifies the prong forming operation and ensures formation of a good and properly shaped point. The rounded end 53 ensures proper bending of the prong to the position shown in Fig. 1 without shearing it from the strip.

At the same time that the prong is formed, the flanges 14 and 15 may respectively be formed with slight indentations 55 and 56 which result in slightly widened zones and any suitable pressure element may effect this result. It will be understood that the rollers may be driven to move the strip lengthwise and that the strip may be periodically stopped for forming the prongs at longitudinally spaced points.

After formation of the strip in the manner stated, the cover 18 may be applied thereto by telescopic movement and the purpose of the slightly widened zone mentioned is to obtain a little greater friction at one point for holding the cover against longitudinal movement. The cover may be formed from stainless steel of relatively thin gauge and may be rolled to the shape desired.

Although only one form of the invention has been illustrated and described in detail, it will be apparent to those skilled in the art that various modifications may be made without departing from the spirit of the invention.

What is claimed is:

1. Apparatus for forming molding from a metal strip, comprising rolls for forming a longitudinally extending continuous groove intermediate the side edges of the strip, and means for striking prongs from the grooved portion of the strip and comprising a supporting member having shoulders for supporting side edge portions of the strip and having an intermediate open-ended slot adapted to allow prongs to be struck out and bent through the slot, and a tool element movable through the slot and adapted to strike out a prong progressively from its pointed end to its opposite end and to bend the prong through the slot.

2. The method of manufacturing molding which comprises forming an elongated strip of malleable metal, treating the strip to strain harden a linear section located intermediate side edges of the strip, and then striking out prongs from the strain hardened section.

3. The method of manufacturing molding which comprises providing an elongated strip of malleable metal, treating the strip to form a groove therein running longitudinally and between the side edges in order to provide a strengthened intermediate section, and then striking out longitudinally spaced prongs from the grooved portion of the strip with each prong having a part of the groove extending longitudinally thereof.

4. The method of manufacturing molding which comprises providing an elongated strip of malleable metal, forming flanged side edge portions on the strip, treating the strip to form a longitudinally running groove therein between the side edge portions in order to provide a strengthened intermediate section, and then striking out longitudinally spaced prongs from the strip with each prong having a part of the groove extending longitudinally thereof.

WILLIAM J. HALL.